United States Patent Office 3,183,258
Patented May 11, 1965

3,183,258
DIALKYL 1-ACYLAMINO 2,2-DICHLORO-
VINYL PHOSPHATES
Max Schuler, Arlesheim, Basel-Land, Hans Helfenberger, Reinach, Basel-Land, and Karl Lutz, Basel, Switzerland, assignors to Sandoz A.G., Basel, Switzerland
No Drawing. Filed Oct. 15, 1962, Ser. No. 230,683
Claims priority, application Switzerland, Nov. 10, 1961, 13,070/61
8 Claims. (Cl. 260—461)

The present invention is concerned with new insecticidally active phosphoric acid esters. The invention is also concerned with use of the said esters and/or compositions containing the same, for combating pests, more especially insects. The invention is also concerned with a process for the preparation of the said new esters.

The new phosphoric acid esters of the present invention correspond to the formula

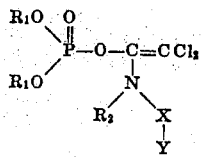

wherein
X is

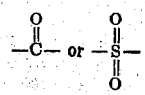

Y is H, $R_3$ —$OR_3$,

or one of the groups —$CH_2$—, —NH— or —O— forming together with $R_2$ members of a heterocyclic ring;
$R_1$ is $CH_3$ or $C_2H_5$;
$R_2$ is lower alkyl (e.g., methyl, ethyl, propyl, butyl, etc.), or lower alkylene (e.g., methylene, ethylene, propylene, etc.) connected with Y to form a heterocyclic ring (including N and X);
$R_3$ is $CH_3$ or $C_2H_5$;
$R_4$ is H, $CH_3$ or $C_2H_5$.

These new compounds I are prepared according to the present invention by reacting a compound of the formula

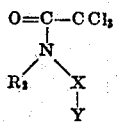

wherein X, Y and $R_2$ have the precedingly-recited significances, with a corresponding trialkylphosphite. The reaction is preferably carried out in a non-polar solvent medium and at raised temperature. Suitable non-polar solvent media are, for example, benzene, chlorobenzene, toluene, xylene, etc.

It is known from the literature that the reaction of trialkylphosphite with normal trichloroacetic acid amide yields no reaction products in the sense of a Perkow reaction (J.A.C.S. 82, 903 (1960)). It was therefore wholly unexpected and entirely surprising that the reaction of trialkylphosphite with a trichloracetic acid derivative of Formula II should take the form of a normal Perkow reaction, leading to products of Formula I. The trichoracetic acid derivatives of Formula II are not described in the literature, i.e., are new.

Suitable compounds of Formula II for carrying out the process of the invention are for example N-trichloracetyl derivatives of methylformamide, N-methylurethane, N-methylacetamide, trimethylurea, trimethylsulfamide, pyrrolidone-2, piperidine-2, ethyleneurea, etc.

The new compounds I are liquid at room temperature, and may be distilled in a high vacuum. They are soluble in oils and in organic solvents and are readily converted into aqueous emulsion form. The new esters I are outstandingly suitable for combatting pests, particularly insects for the purpose of protecting plant growth. They comprise compounds which are distinguished by excellent systemic action.

For combating pests by means of the new phosphoric acid esters of Formula I, the latter are advantageously admixed with emulsifiers, for example with liquid polyglycolethers obtained from high molecular alcohols, mercaptans or alkylphenols by the adding on of ethylene oxide, the resultant mixture then emulsified in water, and the so-obtained aqueous emulsion applied by spraying onto the surface of the plants to be protected, or by "watering" the plants therewith. Solution aids, such as suitable organic solvents, for example mono- or poly-alcohols, ketones, aromatic hydrocarbons, mineral oils, etc., may be added to the aforesaid mixtures. In order to produce water-suspendible products, solid carrier materials such as talc, kaolin, kieselguhr, bentonite, etc., may also be incorporated into the said mixtures. The liquid or pulverulent products are emulsified or dispersed in water before being used, it being preferable that the obtained emulsions or dispersions contain 0.005 to 0.2% by weight of active ester I.

However, the phosphoric acid esters I can also be used without emulsifiers, in which event they are advantageously admixed with adhesion promoting agents and inert carriers such as talc, kaolin, kieselguhr, bentonite, etc., or with a mixture of such carriers, so that the product may be used as a dusting composition or scattering composition, containing, e.g., 0.5–5% active ester.

The following examples set forth presently preferred exemplary embodiments of the invention. Parts and percentages are by weight unless otherwise indicated. The relationship of parts by weight to parts by volume is the same as that between grams and milliliters. Temperatures are in degrees centigrade.

EXAMPLES (A) *Examples of the preparation of intermediates of the formula*

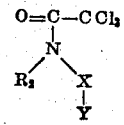

(a) GENERAL METHODS

One mol of a compound of the formula

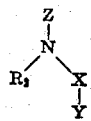

wherein X, Y and $R_2$ have the hereinbefore-recited significances, while Z is H or, in those cases where alkali metal derivatives are to be formed, K or Na, is reacted with one mol of trichloracetyl chloride, the reaction being preferably carried out in a solvent or the like, such for example as chloroform, trichlorethylene, carbon tetrachloride, xylene, etc.

When, in the compound of Formula III, Z=H, the trichloracetyl chloride is stirred dropwise into the said compound at elevated temperature, for example at 60 to 100°

C. or else the said compound of Formula III, if desired in solution form, is added to the trichloracetyl chloride. Thereafter stirring is continued for several more hours at elevated temperature until the reaction has gone to completion. The hydrogen chloride formed in the course of the reaction is continuously removed, advantageously by means of a gentle stream of gas, for example by passing a current of nitrogen or air into the reaction mixture. By distilling off the solvent, there is obtained the compound of Formula II as crude product, and the latter can be purified if desired by recrystallization or by distillation in high vacuum.

When, in the compound of Formula III, Z stands for an alkali metal, the reaction components are brought together while cooling, for example at 0 to 20°, the trichloracetyl chloride being added dropwise to a suspension of the compound of Formula III, or the latter being added portionwise to the trichloracetyl chloride. The reaction is brought to completion at raised temperature, for example at 50 to 100°. In working up the reaction mass, separation from the formed ZCl is effected and the solvent is distilled off. The obtained crude product may be purified by recrystallization or by distillation under high vacuum.

(b) SPECIFIC EXAMPLES

*Example 1.*—A solution of 24 parts of N-methylacetamide in 20 parts by volume of trichlorethylene is stirred dropwise in the course of about one hour into a solution of 61 parts of trichloracetyl chloride in 300 parts by volume of trichlorethylene, while maintaining the reaction mixture at the boil and under reflux, and thereafter continuing the stirring under reflux for three more hours. After distilling off the solvent, the product is purified by distillation. There is thus obtained the N-trichloracetyl derivative of the formula

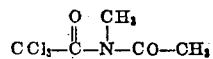

in a yield of about 90%; B.P.$_{0.06}$=53–57°; $n_D^{20}$=1.5040. N calculated 6.4%; found 6.4%.

*Example 2.*—91 parts of trichloracetyl chloride are added dropwise in the course of one hour to a suspension of 80 parts of the compound of the formula

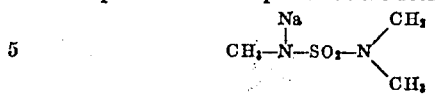

in 350 parts by volume of benzene, the temperature being maintained throughout the said addition at 10 to 15° by cooling. Thereupon stirring is continued for three more hours at 70°. The precipitated NaCl is filtered off warm and washed with warm benzene. By distilling the solvent from the filtrate, there is obtained from the latter the N-trichloracetyl derivative of the formula

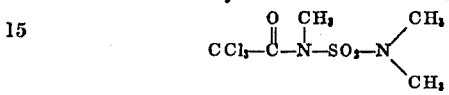

in a yield of 90% as a light-colored viscous oil, which rapidly solidifies to an almost colorless crystalline mass having a melting point of 103°. It can be purified by recrystallization from alcohol, whereupon colorless crystals melting at 106° are obtained. N calculated 9.9%; found 9.9%.

The same N-trichloracetyl compound of the formula

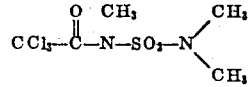

is also obtained by reacting trichloracetyl chloride with trimethylsulfamide in trichlorethylene. After stirring for 12 hours under reflux, the solvent is distilled off and the product is obtained, in a 78% yield, as an almost colorless crystalline mass.

In manner analogous to any of the procedures according to the foregoing examples, the further N-trichloracetyl derivatives set forth in the following table can also be prepared. The table lists the new derivatives of Formula II, characterizing properties, analytical data and, in the last column, the compound of Formula III which is reacted with the trichloracetyl chloride:

TABLE I

| Example No. (a) | Compounds II (b) | Properties (c) | Analyses (d) | Compounds III (e) |
|---|---|---|---|---|
| 3 | CCl$_3$—CO—N(CH$_3$)—CHO | B.P.$_{0.1}$=50–52° | Cl: calc., 52.2%; found, 52.3% | Z—N(CH$_3$)—CHO |
| 4 | CCl$_3$—CO—N(C$_2$H$_5$)—CHO | B.P.$_{0.06}$=48–50° | N: calc., 6.4%; found, 6.1% | Z—N(C$_2$H$_5$)—CHO |
| 5 | CCl$_3$—CO—N(C$_2$H$_5$)—COCH$_3$ | B.P.$_{0.3}$=62° | N: calc., 6.0%; found, 6.2% | Z—N(C$_2$H$_5$)—COCH$_3$ |
| 6 | CCl$_3$—CO—N(CH$_3$)—COOCH$_3$ | B.P.$_{0.1}$=67° | Cl: calc., 45.4%; found, 45..2% | Z—N(CH$_3$)—COOCH$_3$ |
| 7 | CCl$_3$—CO—N(CH$_3$)—COOC$_2$H$_5$ | B.P.$_{11}$=114° | N: calc., 5.6%; found, 5.4% | Z—N(CH$_3$)—COOC$_2$H$_5$ |
| 8 | CCl$_3$—CO—N(C$_2$H$_5$)—COOCH$_3$ | B.P.$_{0.1}$=70–71° | N: calc., 5.6%; found, 5.6% | Z—N(C$_2$H$_5$)—COOCH$_3$ |
| 9 | CCl$_3$—CO—N(C$_2$H$_5$)—COOC$_2$H$_5$ | B.P.$_{0.01}$=74–75° | N: calc., 5.3%; found, 5.4% | Z—N(C$_2$H$_5$)—COOC$_2$H$_5$ |
| 10 | CCl$_3$—CO—N(CH$_3$)—COC$_2$H$_5$ | Light yellow liquid $n_D^{20}$=1.4999° | N: calc., 6.0%; found, 5.9% | Z—N(CH$_3$)—COC$_2$H$_5$ |
| 11 | CCl$_3$—CO—N(CH$_3$)—CO—NHCH$_3$ | B.P.$_{0.11}$=86°; M.P.=34–36° | N: calc., 12.0%; found, 12.4% | Z—N(CH$_3$)—CO—NHCH$_3$ |

TABLE I—Continued

| Example No. (a) | Compounds II (b) | Properties (c) | Analyses (d) | Compounds III (e) |
|---|---|---|---|---|
| 12 | $CCl_3-\overset{O}{\underset{\|}{C}}-\underset{\underset{CH_3}{\|}}{N}-CO-N\underset{CH_3}{\overset{CH_3}{<}}$ | B P.$_{0.04}$=93° | N: calc., 11.3%; found, 11.6% | $Z-\underset{\underset{CH_3}{\|}}{N}-CO-N\underset{CH_3}{\overset{CH_3}{<}}$ |
| 13 | $CCl_3-\overset{O}{\underset{\|}{C}}-\underset{\underset{CH_3}{\|}}{N}-CO-N\underset{C_2H_5}{\overset{C_2H_5}{<}}$ | Light-colored viscous oil. | Cl: calc., 38.6%; found, 38.7%. N: calc., 10.1%; found, 10.0%. | $Z-\underset{\underset{CH_3}{\|}}{N}-CO-N\underset{C_2H_5}{\overset{C_2H_5}{<}}$ |
| 14 | $CCl_3-\overset{O}{\underset{\|}{C}}-\underset{\underset{C_2H_5}{\|}}{N}-SO_2-N\underset{CH_3}{\overset{CH_3}{<}}$ | M.P.=69–71° | | $Z-\underset{\underset{C_2H_5}{\|}}{N}-SO_2-N\underset{CH_3}{\overset{CH_3}{<}}$ |
| 15 | $CCl_3-\overset{O}{\underset{\|}{C}}-\underset{\underset{CH_3}{\|}}{N}-SO_2-N\underset{C_2H_5}{\overset{C_2H_5}{<}}$ | Light yellow liquid | N: calc., 9.0%; found, 9.3% | $Z-\underset{\underset{CH_3}{\|}}{N}-SO_2-N\underset{C_2H_5}{\overset{C_2H_5}{<}}$ |
| 16 | $CCl_3-\overset{O}{\underset{\|}{C}}-\underset{\underset{C_2H_5}{\|}}{N}-SO_2-N\underset{C_2H_5}{\overset{C_2H_5}{<}}$ | B.P.$_{0.2}$=117–120° | N: calc., 8.6%; found, 8.6% | $Z-\underset{\underset{C_2H_5}{\|}}{N}-SO_2-N\underset{C_2H_5}{\overset{C_2H_5}{<}}$ |
| 17 | $CCl_3-\overset{O}{\underset{\|}{C}}-N\begin{smallmatrix}CH_2-CH_2\\ \|\\ CO-CH_2\end{smallmatrix}$ | B.P.$_{0.1}$=106° | N: calc., 6.1%; found, 6.4% | $Z-N\begin{smallmatrix}CH_2-CH_2\\ \|\\ CO-CH_2\end{smallmatrix}$ |
| 18 | $CCl_3-\overset{O}{\underset{\|}{C}}-N\begin{smallmatrix}CH_2-CH_2\\ \|\\ CO-O\end{smallmatrix}$ | M.P.=77° | Cl: calc., 45.8%; found, 45.4% | $Z-N\begin{smallmatrix}CH_2-CH_2\\ \|\\ CO-O\end{smallmatrix}$ |
| 19 | $CCl_3-\overset{O}{\underset{\|}{C}}-N\begin{smallmatrix}CH_2-CH_2\\ \|\\ CO-NH\end{smallmatrix}$ | M.P.=114° | N: calc., 12.1%; found, 12.0% | $Z-N\begin{smallmatrix}CH_2-HC_2\\ \|\\ CO-NH\end{smallmatrix}$ |
| 20 | $CCl_3-\overset{O}{\underset{\|}{C}}-N\begin{smallmatrix}\overset{CH_3}{\|}\\ CH-CH_2\\ \|\\ CO-CH_2\end{smallmatrix}$ | M.P.=38° | N: calc., 5.7%; found, 5.7% | $Z-N\begin{smallmatrix}\overset{CH_3}{\|}\\ CH-CH_2\\ \|\\ CO-CH_2\end{smallmatrix}$ |
| 21 | $CCl_3-\overset{O}{\underset{\|}{C}}-N\begin{smallmatrix}CO-CH_2\\ \quad\quad \|\\ CH_2\quad CH_2\\ \|\\ CH_2-CH_2\end{smallmatrix}$ | M.P.=84° | N: calc., 5.7%; found, 5.9% | $Z-N\begin{smallmatrix}CO-CH_2\\ \quad\quad \|\\ CH_2\quad CH_2\\ \|\\ CH_2-CH_2\end{smallmatrix}$ |

(B) *Examples of the preparation and use of the end-products of the formula*

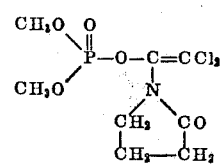

(I)

*Example 22.*—92.2 parts (0.4 mol) of the compound of the formula

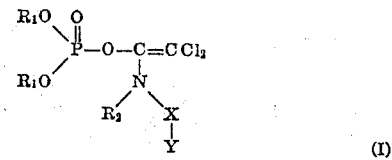

are introduced into 300 parts by volume of xylene, heated to 80°, and then stirred dropwise thereto 52.1 parts (0.4 mol+5% excess) of trimethylphosphite in the course of 20 minutes, during which time the temperature rises to 90 to 110° because of the exothermic character of the reaction. Stirring is then continued for another hour at 100–110°, after which the solvent is distilled off under reduced pressure. Last residues of readily volatile fractions are removed at 0.1 to 0.2 mm. Hg pressure and at a bath temperature of 110°, the compound of the formula

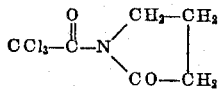

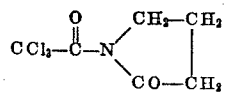

being obtained in a yield of more than 95% as a light-colored oil which can not be distilled in a high vacuum without decomposition. N calculated 4.6%; found 4.6%.

*Example 23.*—By following the procedure described in Example 22, the reaction between 69.2 parts of the compound of the formula and 52.3 parts of triethylphosphite, yields the compound of the formula

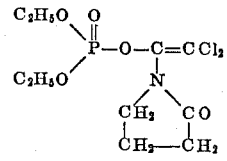

in quantitative yield as a light-colored oil which can not be distilled in a high vacuum without decomposition. N calculated 4.2%; found 4.2%. Cl calculated 21.4%; found 21.5%.

*Example 24.*—27 parts of trimethylphosphite are added dropwise, at 50 to 60° and in the course of 10 minutes, to a solution of 62.3 parts of the compound of the formula

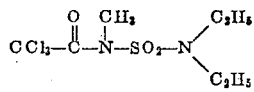

in 200 parts by volume of toluene, the mixture being stirred for one hour under reflux. The solvent is thereupon distilled off, as well as readily volatile fractions, first under water-jet vacuum and then under a pressure of 0.2 mm. Hg and a bath temperature of 110°. There is thus obtained in a 99% yield the compound of the formula

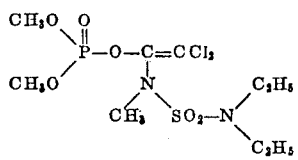

as a light-colored liquid which can not be distilled in high vacuum without decomposition. N calculated 7.3%; found 7.5%. P calculated 8.0%; found 7.8%.

*Example 25.*—A solution of 46.5 parts of the compound of the formula

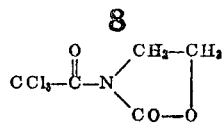

in 150 parts by volume of toluene are added dropwise, at 50 to 60° and in the course of 15 minutes, to a solution of 35 parts by weight of triethylphosphite in 100 parts by volume of toluene. Stirring is then continued for one hour at 100–110°, after which the solvent is distilled off under reduced pressure. There is thus obtained the compound of the formula

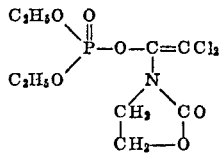

in quantiative yield as light-colored oil which cannot be distilled in high vacuum without decomposition. N calculated 4.2%; found 4.0%. P calculated 9.3%; found 9.6%.

The following table sets forth further compounds of the Formula I which can be prepared according to the procedures set forth in any one of Examples 22 to 25, employing the corresponding trialkylphosphites and corresponding compounds of Formula II. Thus, the reactants in Example 26 are trimethylphosphite and the compound of the formula

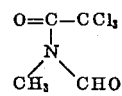

TABLE II

| Example No. (a) | Compounds I (b) | Properties (c) | Analyses (d) |
|---|---|---|---|
| 26 | CH₃O\P(=O)(OCH₃)—O—C(=CCl₂)—N(CH₃)(CHO) | B.P.₀.₁=103–106° | Cl: calc., 25.5%; found, 25.7%. |
| 27 | C₂H₅O\P(=O)(OC₂H₅)—O—C(=CCl₂)—N(CH₃)(CHO) | B.P.₀.₀₃=105–108° | |
| 28 | CH₃O\P(=O)(OCH₃)—O—C(=CCl₂)—N(C₂H₅)(CHO) | B.P.₀.₈=112–115° | P: calc., 10.6%; found 10.2%. |
| 29 | C₂H₅O\P(=O)(OC₂H₅)—O—C(=CCl₂)—N(C₂H₅)(CHO) | Non-distillable. n_D²⁰=1.4696 | N: calc., 4.4%; found, 4.1%. |
| 30 | CH₃O\P(=O)(OCH₃)—O—C(=CCl₂)—N(CH₃)(COCH₃) | Non-distillable | N: calc., 4.8%; found, 4.6%. Cl: calc., 24.3%; found, 24.6. |
| 31 | C₂H₅O\P(=O)(OC₂H₅)—O—C(=CCl₂)—N(CH₃)(COCH₃) | do | |

| Example No. (a) | Compounds I (b) | Properties (c) | Analyses (d) |
|---|---|---|---|
| 32 | $(CH_3O)_2P(O)-O-C(=CCl_2)-N(C_2H_5)(COCH_3)$ | Light yellowish oil | N: calc., 4.6%; found, 4.5%. |
| 33 | $(C_2H_5O)_2P(O)-O-C(=CCl_2)-N(CH_3)(COCH_3)$ | do | |
| 34 | $(CH_3O)_2P(O)-O-C(=CCl_2)-N(C_2H_5)(COCH_3)$ | Light orange liquid $n_D^{20}=1.4787$ | N: calc., 4.6%; found, 4.2%. |
| 35 | $(C_2H_5O)_2P(O)-O-C(=CCl_2)-N(CH_3)(COC_2H_5)$ | Orange oil $n_D^{20}=1.4686$ | |
| 36 | $(CH_3O)_2P(O)-O-C(=CCl_2)-N(CH_3)(COOCH_3)$ | Light yellow liquid $n_D^{20}=1.4787$ | P: calc., 10.1%; found, 10.2%. Cl: calc., 23.1%; found, 22.8%. |
| 37 | $(C_2H_5O)_2P(O)-O-C(=CCl_2)-N(CH_3)(COOCH_3)$ | Light yellow liquid $n_D^{20}=1.4712$ | P: calc., 9.2%; found 9.6%. Cl: calc., 21.1%; found, 21.0%. |
| 38 | $(CH_3O)_2P(O)-O-C(=CCl_2)-N(CH_3)(COOC_2H_5)$ | B.P.$_{0.04}$=122–126° $n_D^{20}=1.4675$ | N: calc., 4.4%; found, 4.7%. P: calc., 9.6%; found, 9.7%. |
| 39 | $(C_2H_5O)_2P(O)-O-C(=CCl_2)-N(CH_3)(COOC_2H_5)$ | B.P.$_{0.02}$=120–122° $n_D^{20}=1.4625$ | N: calc., 4.0%; found, 3.9%. P: calc., 8.9%; found, 9.2%. |
| 40 | $(CH_3O)_2P(O)-O-C(=CCl_2)-N(C_2H_5)(COOC_2H_5)$ | B.P.$_{0.02}$=123–125° $n_D^{20}=1.4698$ | Cl: calc., 21.1%; found, 21.5%. |
| 41 | $(C_2H_5O)_2P(O)-O-C(=CCl_2)-N(C_2H_5)(COOC_2H_5)$ | B.P.$_{0.06}$=132° $n_D^{20}=1.4648$ | N: calc., 3.8%; found, 3.5%. Cl: calc., 19.5%; found, 19.7%. |
| 42 | $(CH_3O)_2P(O)-O-C(=CCl_2)-N(C_2H_5)(COOCH_3)$ | Light yellow oil $n_D^{20}=1.4749$ | Cl: calc., 22.0%; found, 22.4%. P: calc., 9.6%; found, 9.6%. |
| 43 | $(C_2H_5O)_2P(O)-O-C(=CCl_2)-N(C_2H_5)(COOCH_3)$ | Light orange oil $n_D^{20}=1.4650$ | Cl: calc., 20.3%; found, 20.7%. P: calc., 8.9%; found, 8.7%. |
| 44 | $(CH_3O)_2P(O)-O-C(=CCl_2)-N(CH_3)(CO-NHCH_3)$ | Light yellow oil | N: calc., 9.1%; found, 9.3%. |

Table II—Continued

| Example No. (a) | Compounds I (b) | Properties (c) | Analyses (d) |
|---|---|---|---|
| 45 | $(C_2H_5O)_2P(O)-O-C(=CCl_2)-N(CH_3)-CONHCH_3$ | Light yellow oil | N: calc., 9.1%; found, 9.3%. |
| 46 | $(CH_3O)_2P(O)-O-C(=CCl_2)-N(CH_3)-CO-N(CH_3)_2$ | do | N: calc., 8.7%; found, 9.0%. P: calc., 9.7%; found, 9.6%. |
| 47 | $(C_2H_5O)_2P(O)-O-C(=CCl_2)-N(CH_3)-CO-N(CH_3)_2$ | Almost colorless oil | N: calc., 8.0%; found, 8.1%. |
| 48 | $(CH_3O)_2P(O)-O-C(=CCl_2)-N(CH_3)-CO-N(C_2H_5)_2$ | Light yellowish oil | N: calc., 8.0%; found, 8.2%. P: calc., 8.9%; found, 8.7%. |
| 49 | $(C_2H_5O)_2P(O)-O-C(=CCl_2)-N(CH_3)-CO-N(C_2H_5)(CH_3)$ | Light yellowish oil | N: calc., 7.4%; found, 7.3%. P: calc., 8.2%; found 8.0%. |
| 50 | $(C_2H_5O)_2P(O)-O-C(=CCl_2)-N(CH_3)-SO_2-N(C_2H_5)_2$ | Light orange oil | N: calc., 6.8%; found, 6.6%. |
| 51 | $(CH_3O)_2P(O)-O-C(=CCl_2)-N(CH_3)-SO_2-N(CH_3)_2$ | Weakly yellowish oil | N: calc., 7.8%; found, 7.9%. P: calc., 8.7%; found, 8.4%. |
| 52 | $(C_2H_5O)_2P(O)-O-C(=CCl_2)-N(CH_3)-SO_2-N(CH_3)_2$ | do | N: calc., 7.3%; found, 7.1%. P: calc., 8.0%; found, 7.7%. |
| 53 | $(CH_3O)_2P(O)-O-C(=CCl_2)-N(C_2H_5)-SO_2-N(C_2H_5)_2$ | Light orange oil | N: calc., 7.0%; found, 7.3%. |
| 54 | $(C_2H_5O)_2P(O)-O-C(=CCl_2)-N(C_2H_5)-SO_2-N(C_2H_5)_2$ | do | N: calc., 6.6%; found, 6.4%. |
| 55 | $(CH_3O)_2P(O)-O-C(=CCl_2)-N(CH_2-CH_2-O)CO$ | Light yellowish oil | |

Table II—Continued

| Example No. (a) | Compounds I (b) | Properties (c) | Analyses (d) |
|---|---|---|---|
| 56 | $CH_3O$–$P(=O)(OCH_3)$–$O$–$C$=$CCl_2$, with N bonded to ring: $CH_2$–$CO$, $CH_2$–$NH$ | Light yellowish oil | N: calc., 9.2%; found, 9.3%. |
| 57 | $C_2H_5O$–$P(=O)(OC_2H_5)$–$O$–$C$=$CCl_2$, N-ring: $CH_2$–$CO$, $CH_2$–$NH$ | do | |
| 58 | $CH_3O$–$P(=O)(OCH_3)$–$O$–$C$=$CCl_2$, N-ring: $CH_3$–$CH$–$CO$, $CH_2$–$CH_2$ | do | N: calc., 4.4%; found, 4.6%. Cl: calc., 22.3%; found, 22.7%. |
| 59 | $C_2H_5O$–$P(=O)(OC_2H_5)$–$O$–$C$=$CCl_2$, N-ring: $CH_3$–$CH$–$CO$, $CH_2$–$CH_2$ | do | N: calc., 4.0%; found, 3.9%. P: calc., 9.0%; found, 8.9%. |
| 60 | $C_3H_7O$–$P(=O)(OCH_3)$–$O$–$C$=$CCl_2$, N-ring: $CH_2$–$CO$, $CH_2$–$CH_2$, $CH_2$ | Light brownish oil | N: calc., 4.4%; found, 4.2%. |
| 61 | $C_2H_5O$–$P(=O)(OC_2H_5)$–$O$–$C$=$CCl_2$, N-ring: $CH_2$–$CO$, $CH_2$–$CH_2$, $CH_2$ | Light brown oil | N: calc., 4.0%; found, 4.0%. |
| 62 | $CH_3O$–$P(=O)(OCH_3)$–$O$–$C$=$CCl_2$, N with $C_2H_5$ and $SO_2$–$N(CH_3)_2$ | Light orange oil | N: calc., 7.6%; found, 7.2%. |
| 63 | $C_2H_5O$–$P(=O)(OC_2H_5)$–$O$–$C$=$CCl_2$, N with $C_2H_5$ and $SO_2$–$N(CH_3)_2$ | do | |

*Example 64.*—50 parts of the ester of the formula

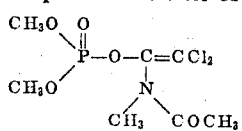

are admixed with 50 parts of isooctylphenyloctaglycolether, a clear solution being obtained. An aqueous solution of mixture, containing 0.05% of the ester, is sprayed onto young apple trees infested with aphis. In a few hours, all the aphis have been killed.

*Example 65.*—20 parts of the ester of the formula

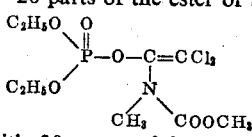

are admixed with 30 parts of isooctylphenyloctaglycolether and 50 parts of a petroleum fraction which boils at 210–280°, specific gravity (20°) 0.92, a clear solution being obtained which is well emulsifiable in water. Such an emulsion, containing 0.02% of the ester, effects a 100% kill on aphis.

*Example 66.*—20 parts of the ester of the formula

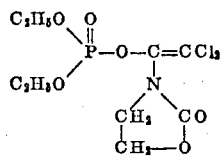

are admixed with 20 parts of laurylhexaglycolether and 60 parts of xylene, the resultant product being readily water-emulsifiable. A 0.1% aqueous emulsion of this product, which emulsion contains 0.02% of the said ester, is sprayed onto potted plants (Cineraria, asters (chrysanthemums) infested with aphis. In a short time, all aphis are dead.

*Example 67.*—(a) By admixing 25 parts of the ester of the formula

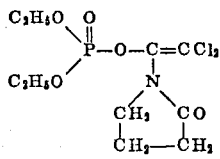

with 25 parts of diisohexyl-heptylphenylhexaglycolether, 25 parts of xylene and 25 parts of diethyleneglycol, a product is obtained which is well emulsifiable with water. Potted spiderwort plants of a height of about 20 cm. are each watered with 100 milliliters of an aqueous emulsion of the said product, such emulsion containing 0.02% of the active ester, care being taken that no green parts of the plant are wetted. The next day, 30 grasshopper larvae (*Carausius morosus*), second stage, are applied to each plant. The larvae feed on the leaves and in this way also include in their nourishment the aforesaid active ester which has been taken in by the roots of the plants and transported to the leaves. At the end of 8 days, no living larvae remain; all are dead.

(b) A 0.1% aqueous emulsion of the same product, said emulsion containing 0.025% of the active ester, is sprayed on aphis-infected plants of *Erigeron canadense*, in such manner that only the bottom part of the plants (not roots) are contacted, while the upper part of the plants—where the aphis are—remains untreated. After 2 to 3 days, all aphis on the not-directly treated upper part are dead.

(c) Bean plants in the two-leaf stage and which are infected with *Aphis fabae* are sprayed with an aqueous emulsion of the same product—which emulsion contains 0.04% of the said active ester whereupon, in a few hours, all the aphis have been killed.

(d) The active ester of formula

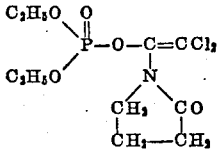

used in paragraphs (a) to (c), can be replaced by corresponding amount of the ester of formula

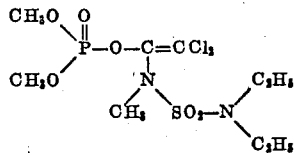

whereupon the same successful results will be achieved.

*Example 68.*—A pulverulent product of good suspendability in water is obtained by intimately admixing 15 parts of the ester of the formula

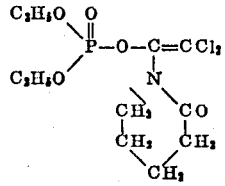

with 3 parts of tert. dodecylmercaptanundecaglycolether, 7 parts of powdered silica gel and 75 parts of kaolin. A suspension prepared from this mixture and containing 0.1% of the said ester, when sprayed on aphis, effects a complete kill in a few hours.

*Example 69.*—2 parts of the ester of the formula

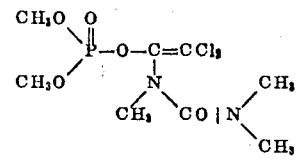

are admixed with 98 parts of talc, and the mixture ground in a ball mill. The resultant product is a dusting agent which, dusted on areas infected by cockroaches (*Periplaneta americana*), effects a 100% kill in 24 to 48 hours of all the roaches which come into contact with the dust.

Having thus disclosed the invention, what is claimed is:

1. A compound of the formula

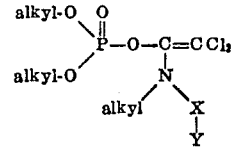

wherein X is a member selected from the group consisting of

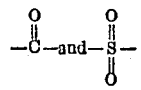

and

Y is a member selected from the group consisting of H, alkyl, —O-alkyl, —N(alkyl)$_2$ and —NH(alkyl), alkyl being throughout alkyl with a maximum of two carbon atoms.

2. A compound of the formula

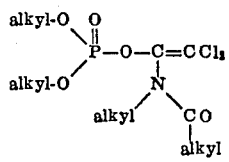

wherein each alkyl has a maximum of two carbon atoms.

3. A compound of the formula

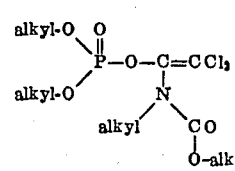

wherein each alkyl has a maximum of two carbon atoms.

4. A compound of the formula

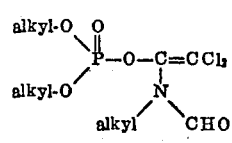

wherein each alkyl has a maximum of two carbon atoms.

5. A compound of the formula

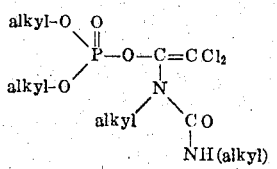

wherein each alkyl has a maximum of two carbon atoms.

6. A compound of the formula

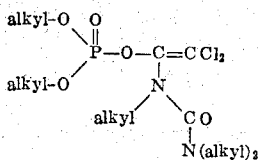

wherein each alkyl has a maximum of two carbon atoms.

7. A compound of the formula

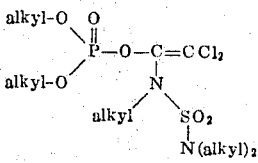

wherein each alkyl has a maximum of two carbon atoms.

8. A compound of the formula

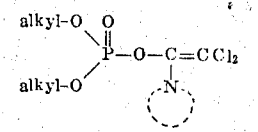

wherein

represents a member selected from the group consisting of

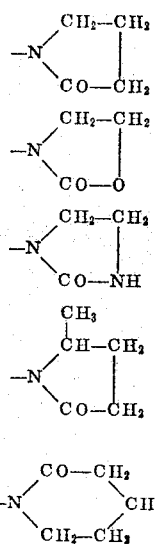

and

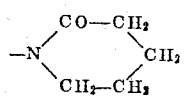

and each alkyl has a maximum of two carbon atoms.

References Cited by the Examiner

UNITED STATES PATENTS

| | | | |
|---|---|---|---|
| 2,801,200 | 7/57 | Hackmann | 167—22 |
| 2,802,855 | 8/57 | Whetstone et al. | 260—461 |
| 2,865,912 | 12/58 | Pohlemann et al. | 260—326.5 |
| 2,938,831 | 5/60 | Gordon | 167—33 |
| 2,968,591 | 1/61 | Tracy | 167—22 |

FOREIGN PATENTS 783,697  10/53  Great Britain.

CHARLES B. PARKER, *Primary Examiner.*

IRVING MARCUS, *Examiner.*